United States Patent [19]

Randall

[11] 4,170,732

[45] Oct. 9, 1979

[54] PULSED NEUTRON POROSITY LOGGING METHOD AND APPARATUS USING DUAL DETECTORS

[75] Inventor: Russel R. Randall, Houston, Tex.

[73] Assignee: Dresser Industries, Inc., Dallas, Tex.

[21] Appl. No.: 829,763

[22] Filed: Sep. 1, 1977

[51] Int. Cl.² .............................................. G01V 5/00
[52] U.S. Cl. ................................... 250/264; 250/266; 250/270
[58] Field of Search ............... 250/264, 265, 266, 269, 250/270

[56] References Cited

U.S. PATENT DOCUMENTS 4,004,147 1/1977 Allen .................................... 250/264

*Primary Examiner*—Davis L. Willis

*Attorney, Agent, or Firm*—Robert W. Mayer

[57] ABSTRACT

A source of fast neutrons and two differently spaced detectors are utilized in a well logging instrument, each of such detectors being responsive to the thermal neutron population decay rate. The inverse of this decay rate is proportional to the measured macroscopic absorption cross section (Sigma). The measured Sigma is obtained simultaneously as a function of the radiation detected by each of two detectors. The signal generated which is indicative of the Sigma observed from one detector is subtracted from the Sigma observed by the second detector. The difference between the measured Sigma from two differently spaced detectors provides a unique function of the fluid-filled porosity of the formations giving rise to the measured Sigma values.

9 Claims, 9 Drawing Figures

PULSED NEUTRON POROSITY LOGGING METHOD AND APPARATUS USING DUAL DETECTORS

BACKGROUND OF THE INVENTION

This invention relates generally to radioactivity well logging, and particularly, to methods and apparatus for deriving the fluid-filled porosity of the formations surrounding an earth borehole.

It is well known in the prior art to utilize a pulsed neutron source and a pair of spaced radiation detectors to provide an indication of the formation porosity. With such prior art devices, the near-spaced detector is gated on during some interval between the neutron burst and the far-spaced detector is similarly gated on during some gating interval between bursts. The signals from the first detector are then combined with the signals from the second detector to result in a ratio which is indicative of the formation porosity.

For example, in U.S. Pat. No. 3,379,882 to Arthur H. Youmans which issued on Apr. 23, 1968, and which is assigned to the assignee of the present application, it is disclosed with respect to FIG. 13 of that patent that the ratio is achieved by combining signals from the two detectors in a ratio circuit and specifically that the gating intervals should be identical.

Furthermore, in U.S. Pat. No. 3,621,255 to Robert J. Schwartz which issued on Nov. 16, 1971, there is disclosed a concept much like the aforementioned Youmans patent which is said to provide an indication of the formation porosity by producing signals from each of the detectors which are combined in ratio circuitry to provide a signal which is related to the porosity of the formation. The circuitry described in the Schwartz patent speaks of automatically adjusting the gates in the two detectors in accordance with the formation characteristics being logged, but does not particularly indicate how the gates associated with one detector would relate in time to the gates associated with the other detector.

Furthermore, in U.S. Pat. application Ser. No. 806,050, filed June 13, 1977, in the name of Eric C. Hopkinson, and assigned to the assignee of the present application, there is disclosed circuitry such that the radiation detectors are gated differently from each other to provide an indication of formation porosity which is substantially independent of the formation salinity. In the preferred embodiment of that application, the electrical signals indicative of radiation detected by the long-spaced detector are gated for almost the entire interval between neutron pulses and the short-spaced signals are gated for a significantly smaller time interval which commences soon after the termination of a given neutron burst. The signals from the two detectors are combined in a ratio circuit for determination of porosity.

In short, the prior art system for determining porosity from dual spaced detectors teaches that the intensity observed by differently spaced detectors can be used to indicate the porosity in the ratio system.

Although the prior art method and apparatus have enjoyed a fair degree of success in determining the fluid-filled porosity of earth formations, there nonetheless exists a need for a system which is less affected by salinity and other borehole effects.

Furthermore, in U.S. Pat. No. 3,868,505 to L. A. Jacobsen et al, issued on Feb. 25, 1975, there is disclosed the use of dual spaced detectors from which a long-spaced and a short-spaced Sigma is derived, but as an indication of the quality of the Sigma from the short-spaced detector because of a so-called diffusion correction. In fact, however, the system in accordance with that patent needs an indication of porosity to make an accurate diffusion correction. Such a system can be classified as a diffusion-corrected measurement of the macroscopic absorption cross section.

It is therefore the primary object of the present invention to provide new and improved methods and apparatus for determining the fluid-filled porosity of earth formations surrounding a borehole;

It is also an object of the present invention to provide new and improved methods and apparatus for simultaneously measuring the porosity and the macroscopic absorption cross section of a formation.

The objects of the invention are achieved, generally, by methods and apparatus which utilize a source of pulsed neutrons and a pair of radiation detectors from which a pair of macroscopic absorption cross section measurements are derived and the difference between such measurements is utilized as being functionally related to the fluid-filled porosity of the earth formations surrounding the borehole.

These and other objects, features and advantages of the present invention will be more readily appreciated from a reading of the following detailed specification and drawing, in which:

Figure 1:
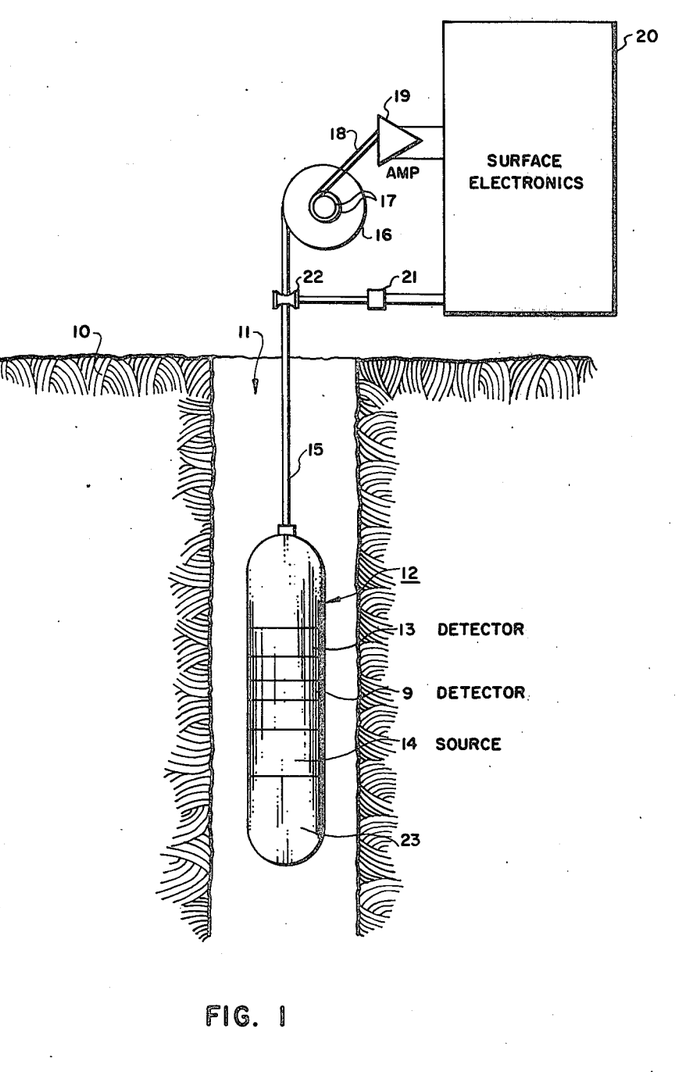
FIG. 1 is a side elevational view, partly in cross section, illustrating apparatus according to the invention, and the disposition of such apparatus relative to the strata to be examined.

Referring now to the drawing in more detail, particularly to FIG. 1, there is illustrated schematically a radioactivity well surveying operation in which a portion of the earth's surface 10 is shown in vertical section. A well 11 penetrates the earth's surface and may or may not be cased. Disposed within the well is subsurface instrument 12 of the well logging system. Subsurface instrument 12 comprises a detecting system comprised of radiation detectors 9 and 13 and a pulsed neutron source 14. Cable 15, preferably a multiconductor cable well known in the art, suspends the instrument in the well and contains the required conductors for electrically connecting the instrument with the surface apparatus. The cable is wound on, or unwound from, drum 16 in raising and lowering the instrument 12 to traverse the well. In making a radioactivity log of a well, instrument 12 is caused to traverse the well. During the traversal, discrete bursts of high energy neutrons from source 14 irradiate the formations surrounding the borehole, and radiations influenced by the formations are detected by the detecting system comprised of detectors 9 and 13. The resultant signals are sent to the surface through cable 15. Through slip rings and brushes 17 on the end of the drum 16, the signals are conducted by lines 18 to the amplifier 19 for amplification. The amplified signals are conducted to the surface electronics 20, described hereinafter in greater detail. A recorder, for example, the recorder 100 illustrated in FIG. 6, within the electronics section 20 is driven through a transmission 21 by measuring reel 22, over which cable 15 is drawn, so that the recorder moves in correlation with depth as instrument 12 traverses the well. Amplifier 19 may be included in the subsurface instrument, or amplification may be effected both on the surface and in the subsurface instrument. It is also to be understood that the instrument housing 23 is constructed to withstand the pressures and mechanical and thermal abuses encountered in logging a deep well.

As is well known in the art of radioactivity well logging, the formation 10 is irradiated by high energy neutrons from the neutron source 14, for example, a D-T accelerator. These neutrons participate in elastic and inelastic collisions with the atoms contained in the various layers of the formation. The secondary radiation resulting from bombardment by the primary radiation in the form of neutrons from the source 14 is detected by the radiation detectors 9 and 13.

It should be appreciated that the detectors 9 and 13 are arranged in a trailing relationship to the source 14. A suitable radiation shield is preferably interposed between the source 14 and the nearest detector 9 to prevent direct irradiation of that detector. As used herein, the expression "trailing relationship" is merely intended to describe the spacing of the detectors relative to the source, and does not mean that the detectors necessarily follow the source through the borehole. It should furthermore be appreciated that, if desired, the detectors 9 and 13 can straddle the source 14.

Radiation detection systems for use in accordance with the present invention are well known in the prior art, for example, in U.S. Pat. No. 3,706,884. Although not illustrated, it should be appreciated that each of the detectors 9 and 13 will preferably include a crystal, for example, CsI or NaI, which is used as a scintillation crystal. For purposes of the present invention, it is desirable that the crystal used have an output proportional to the energy of a gamma ray photon received. A crystal of this type emits a photon of light energy when a gamma ray photon impinges upon it, and the energy of the light photon is proportional to the energy of the incoming gamma ray photon. The scintillation from such a crystal is coupled to a photomultiplier tube (not illustrated) which produces electrical pulses proportional to the intensity of the light produced by the crystal. The crystal and photomultiplier can be fabricated, if desired, according to U.S. Pat. No. 3,254,217 to Arthur H. Youmans. These signals pass to a conventional preamplifier stage (not illustrated). The pre-amplifier is normally connected to a discriminator (not illustrated) which is set to respond to pulses of a preselected magnitude. It should be appreciated that such a discriminator can be built in accordance with FIG. 4.1, page 204 of *Electronics, Experimental Techniques,* Elmore and Sands, published by the McGraw-Hill Book Co., Inc., in 1949.

Figure 2A:
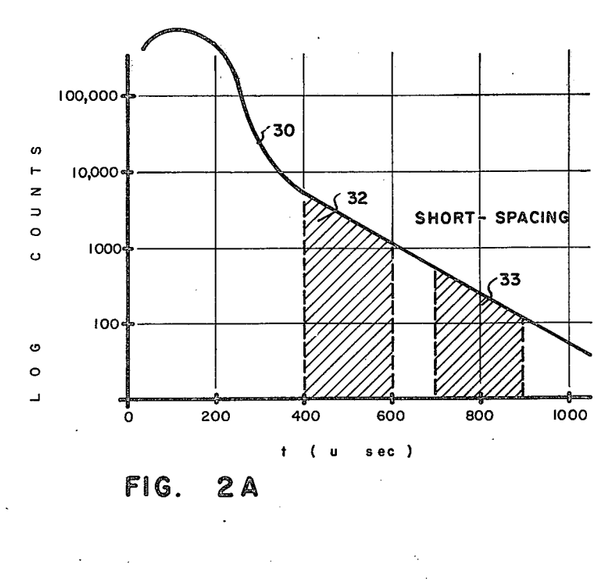
FIGS. 2A and 2B are schematic representations of the characteristic decay of a thermal neutron population following a burst of fast neutrons within a well and the method of utilizing the two gates associated with each of the two detectors to provide an indication of formation porosity in accordance with the present invention.
Figure 2B:
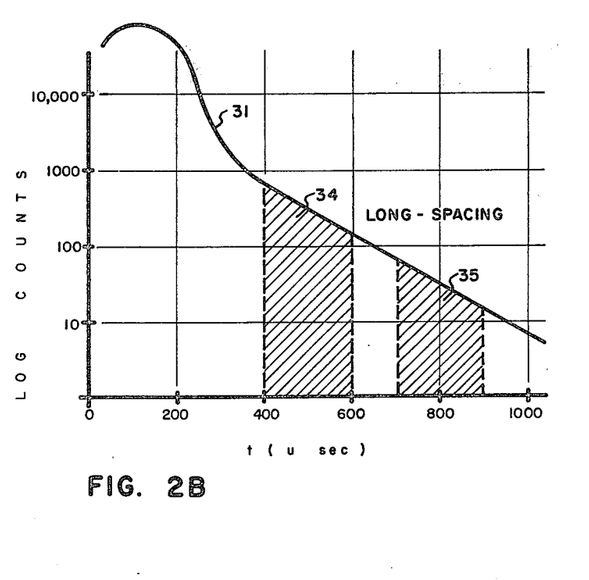

Referring now to FIGS. 2A and 2B, there is graphically illustrated a pair of waveforms 30 and 31 which are representative of the detected radiation which is used to provide a porosity measurement in accordance with the present invention. The curve 30 is representative of the decline of the thermal neutron population as measured by the short-spaced detector 9 and the curve 31 is representative of the decline of the thermal neutron population as measured by the long-spaced detector 13. With the data which produces such curves, the decline of the thermal neutron population is computed by measuring the radiation beneath the curve occurring during the gates 32 and 33 and during the gates 34 and 35 illustrated beneath the curve 31 in FIG. 2B. It should be appreciated that in the preferred embodiment, the gates 32 and 34 are set to coincide with each other, viz., from 400 to 600 microseconds following the burst of fast neutrons. In a similar manner, the gates 33 and 35 coincide and occur between 700 and 900 microseconds following each neutron burst.

Figure 3:
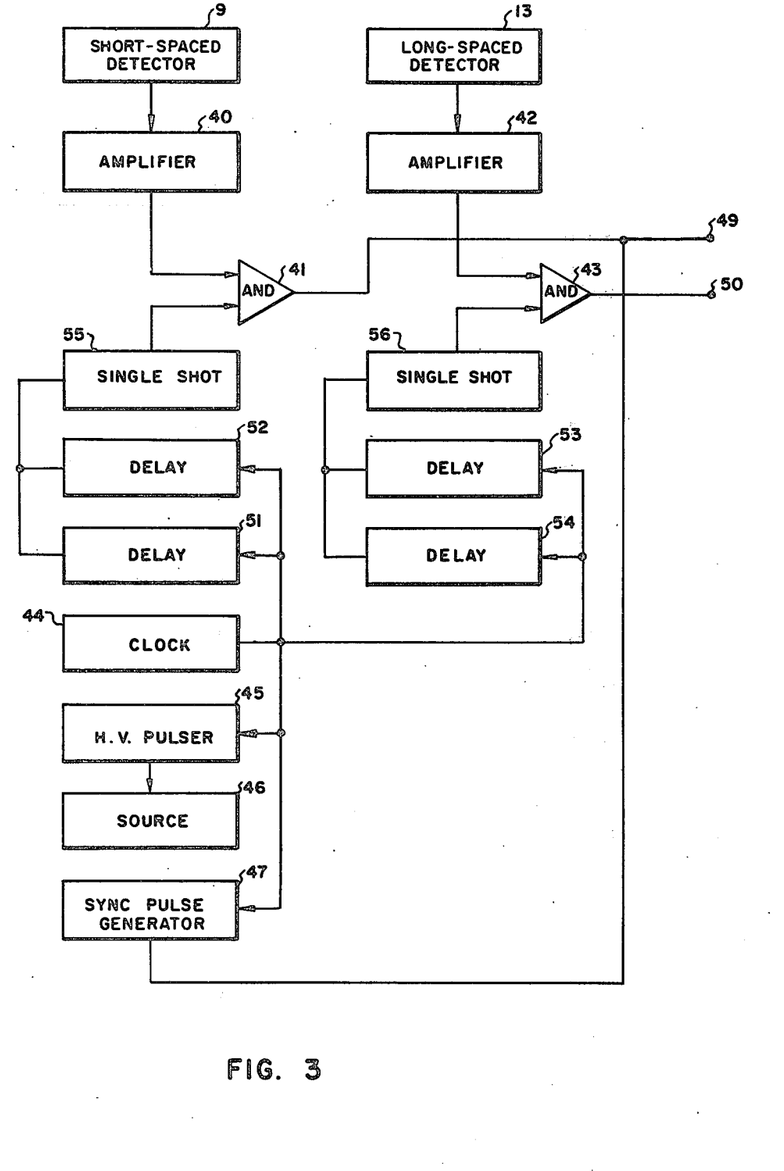
FIG. 3 illustrates in block diagram the subsurface circuitry in accordance with the present invention.

Referring now to FIG. 3, there is illustrated the subsurface circuitry for generating the sync signals, gate pulses, and signal pulses hereinafter illustrated and described. The short-spaced detector 9 is coupled to an amplifier 40 whose output is connected into one input of a two-input AND gate 41. The long-spaced detector 13 is connected to an amplifier 42 whose output is connected to one input of a two-input AND gate 43. A clock circuit 44 has its output connected to a high voltage pulser 45 which drives the conventional neutron source 46. In the preferred embodiment of the present invention, the source 45 is a conventional D-T accelerator producing high energy 14 Mev neutrons at a rate as determined by the clock to produce pulses 1000 microseconds apart. The discrete bursts of neutrons are generally of 10 to 50 microseconds duration. The clock 44 also drives a sync pulse generator 47 having its output connected to the junction 49. The output of the AND gate 41 is also connected to the junction 49. The output of the AND gate 43 is connected to the junction 50. The junction 49 is connected to the center conductor of the seven-conductor cable 15 and the junction 50 is connected to one of the other conductors of cable 15.

Clock 44 is also connected to delay circuits 51, 52, 53 and 54. The outputs of delay circuits 51 and 52 are connected to the input of a single shot multivibrator 55 and the outputs of delay circuits 53 and 54 are connected to the input of a single shot multivibrator 56. The output of the single shot multivibrator 55 is connected to the other input of AND gate 41, and the output of single shot multivibrator 56 is connected to the other input of AND gate 43. The delay circuits 51 and 54 are each set to have a delay of 400 microseconds, and the delay circuits 52 and 53 are each set to have a delay of 700 microseconds. Each of the single shot multivibrators 55 and 56 produces a square wave of 200 microseconds in duration.

Figure 4A:
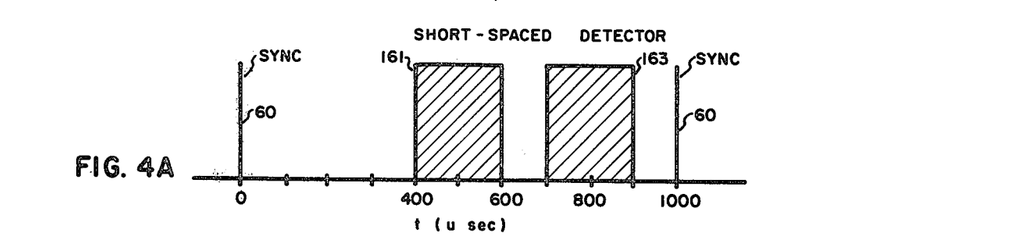
FIGS. 4A and 4B graphically illustrate the representative sync pulses and gate intervals used in accordance with the present invention.
Figure 4B:
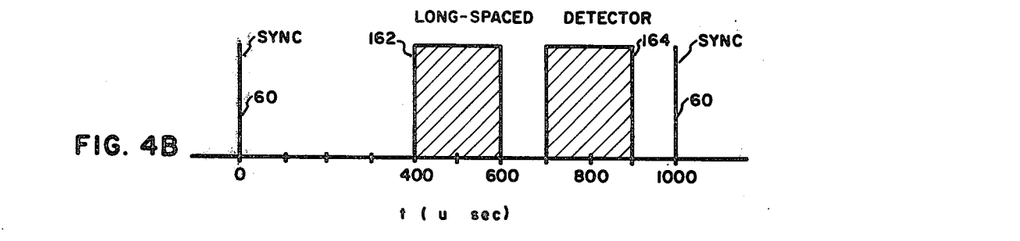

The sync and gating signals used in the circuitry of FIG. 3 are illustrated schematically in FIGS. 4A and 4B. The sync signals 60 are generated 1000 microseconds apart. The gating signals 161 and 162, being of 200 microseconds duration, are representative of the output of the single shot multivibrators 55 and 56 following the delays generated by the delay circuits 51 and 54. The gating signals 163 and 164 are representative of the outputs of the single shot multivibrators 55 and 56 following the delays generated by the delay circuits 52 and 53.

In the operation of the circuitry and apparatus illustrated in FIG. 3, taken in conjunction with the gating diagrams of FIGS. 4A and 4B, the clock 44 causes the neutron source 46 to generate discrete bursts of neutrons, each of such bursts being separated by approximately 1000 microseconds. The short-spaced detector 9 and the long-spaced detector 13 detect gamma radiation resulting from the capture of thermal neutrons occasioned in the formation surrounding the borehole by the neutron source 46. The detected pulses from the short-spaced detector 9 are amplified by the amplifier 40 and are passed through the AND gate 41 during the gate intervals 161 and 163 occurring after each of the neutron bursts. In a similar manner, radiation detected by the long-spaced detector 13 causes the electrical pulses to be amplified by amplifier 42 and are gated through the AND gate 43 in coincidence with the gates 162 and 164 occurring subsequent to each of the neutron bursts. Electrical signals indicative of the detected radiation are passed from the AND gate 41 and along with the sync pulses are coupled to the junction 49 for transmission to the earth's surface. The electrical signals indicative of the detected radiation from the long-spaced detector 13 are coupled from the AND gate 43 to the junction 50 for transmission to the earth's surface.

Figure 5:
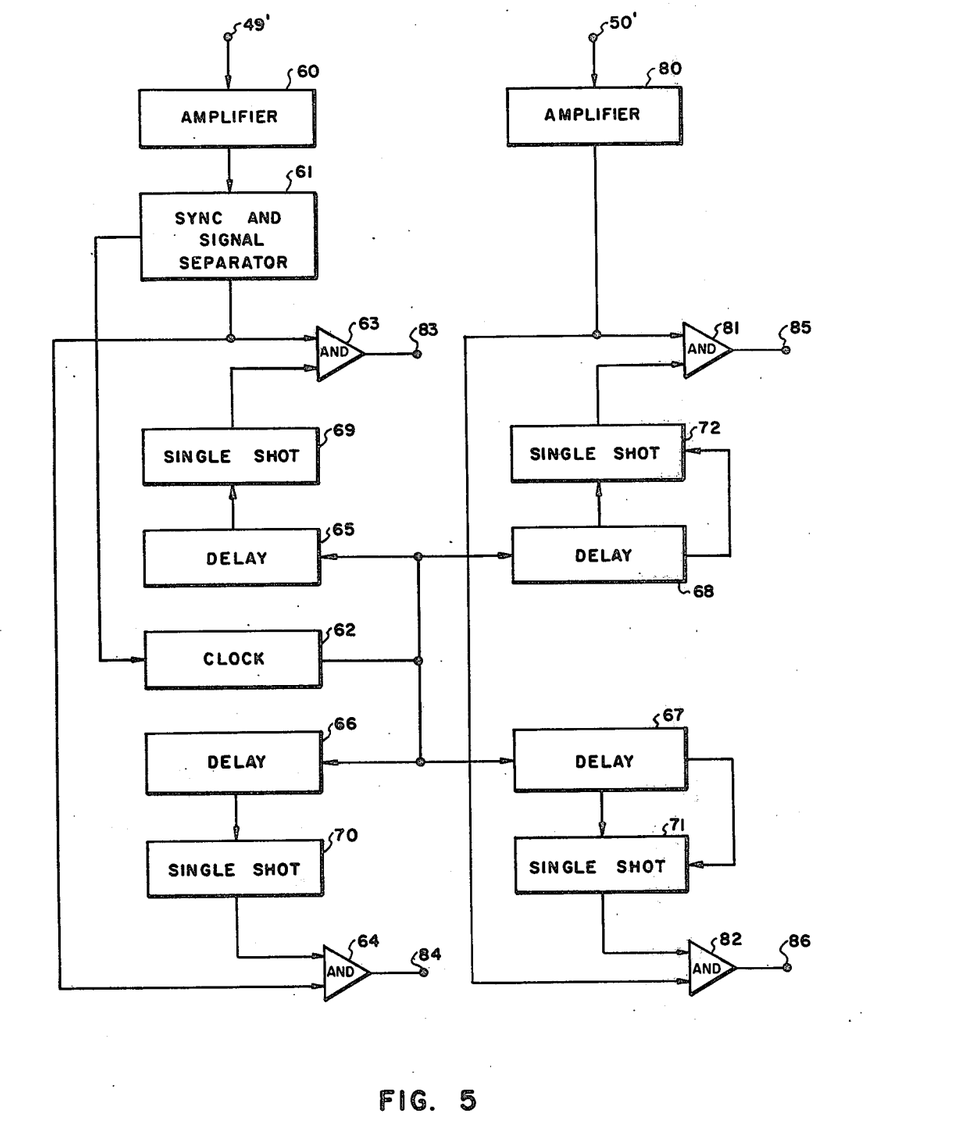
FIG. 5 illustrates in block diagram a portion of the surface electronics in accordance with the present invention.

Referring now to FIG. 5, a portion of the surface electronics shown generally by the reference numeral 20 in FIG. 1 is shown in greater detail. The junction 49' corresponds to the junction 49 in the subsurface circuitry. In a similar manner, the junction 50' corresponds to the junction 50 in the subsurface circuitry. The junction 49' is coupled through an amplifier 60 to a conventional sync and signal separator circuit 61 which separates the sync signals from the amplified signal pulses. The separation can be achieved by any of the conventional circuit devices, for example, through pulse height discrimination. The sync output of the circuit 61 is coupled into the input of the clock 62 which generates clock signals of the same output frequency as that of the sync signals. The signal output of the separator circuit 61 is coupled into one input of a two-input AND gate 63 and also into one input of a two-input AND gate 64. The clock circuit 62 has its output connected to the input of delay circuits 65, 66, 67 and 68 whose inputs are connected, respectively, to single shot multivibrators 69, 70, 71 and 72.

The junction 50' is connected through amplifier 80 to one input of a two-input AND gate 81 and to one input of a two-input AND gate 82. The outputs of AND gates 63, 64, 81 and 82 are connected, respectively, to junctions 83, 84, 85 and 86. The delay circuits 65 and 68 are set to have delays of 400 microseconds and delay circuits 66 and 67 are set to have delays of 700 microseconds. Each of the single shot multivibrators 69, 70, 71 and 72 produces a square wave of 200 microseconds duration.

In the operation of the surface electronics illustrated in FIG. 5, it should be readily apparent that the gating circuits are set to coincide with the gating circuits of the subsurface electronics such that the radiation occasioned in the short-spaced detector 9 and occurring during the gating interval 161 will appear as electrical signals at junction 83. In a similar manner, the short-spaced detector signals occurring during the gating interval 163 will occur as electrical signals at junction 84. Furthermore, the long-spaced detector signals occurring during the gating interval 162 will occur as electrical signals at junction 85, and the long-spaced detector radiation occurring during the gating interval 164 will occur as electrical signals at junction 86. The end use for the signals occurring at junctions 83, 84, 85 and 86 will be explained in more detail with respect to FIG. 6.

Figure 6:
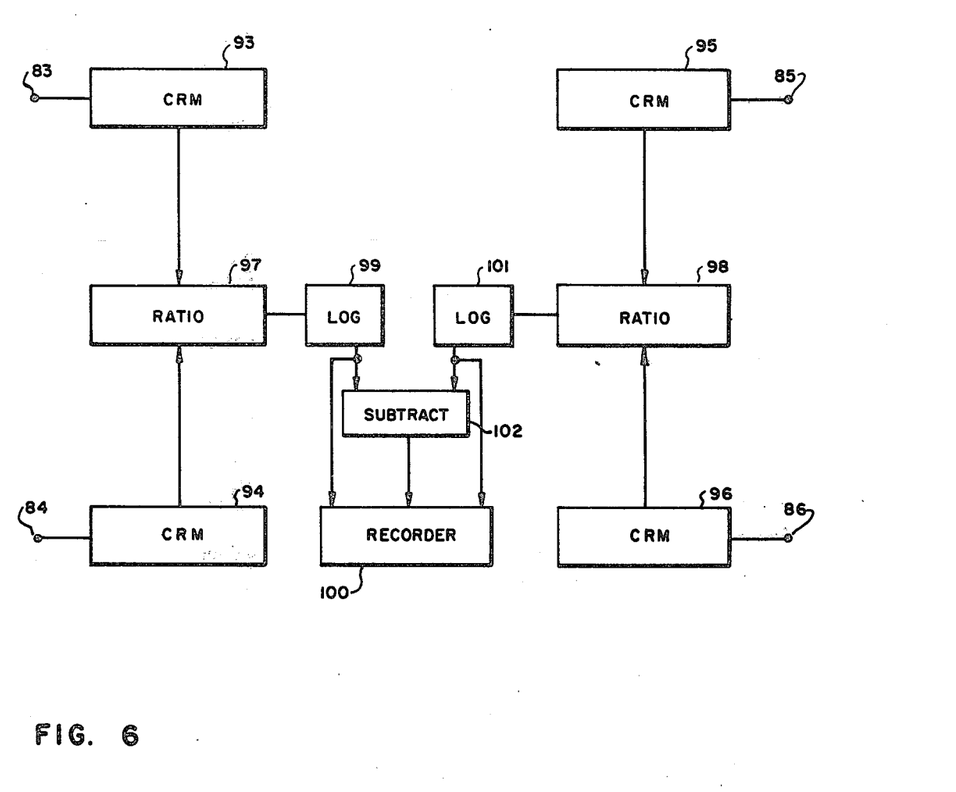
FIG. 6 illustrates in block diagram additional surface electronics utilized in accordance with the present invention.

Referring now to FIG. 6, the junctions 83, 84, 85 and 86, also shown in FIG. 5, are connected, respectively, into count rate meters 93, 94, 95 and 96. The count rate meters 93 and 94 are connected to a ratio circuit 97 and the count rate meters 95 and 96 are connected to a ratio circuit 98. The ratio circuit 97 is connected to a logarithmic circuit 99. The ratio circuit 90 is connected to a logarithmic circuit 101. The outputs of the logarithmic circuits 99 and 101 are each connected to the recorder 100. The outputs of the logarithmic circuits 99 and 101 are also coupled into a subtraction circuit 102 whose output is recorded on the recorder 100.

In the operation of the circuitry of FIG. 6, the first gate, short-spaced detector signals are counted by the count rate meter circuit 93 and the second gate, short-spaced detector signals are counted by the count rate meter 94. In a similar manner, the first gate, long-spaced detector signals are counted by the count rate meter 95 and the second gate, long-spaced detector signals are counted by the count rate meter 96. The ratio circuit 97 provides a ratio of the first and second gate signals for the short-spaced detector and the ratio circuit 98 provides a ratio of the first and second gate signals for the long-spaced detector. The logarithmic circuits 99 and 101, respectively, provide a natural logarithm signal of the ratio signals provided by the ratio circuits 97 and 98. The subtraction circuit 102 provides a difference between the outputs of the logarithmic circuits 99 and 101. As will be explained hereinafter in greater detail, the Sigma values for the long and short-spaced detectors are thus recorded on the recorder 100, as is the difference between those Sigma values as represented by the output of the subtraction circuit 102.

Figure 7:
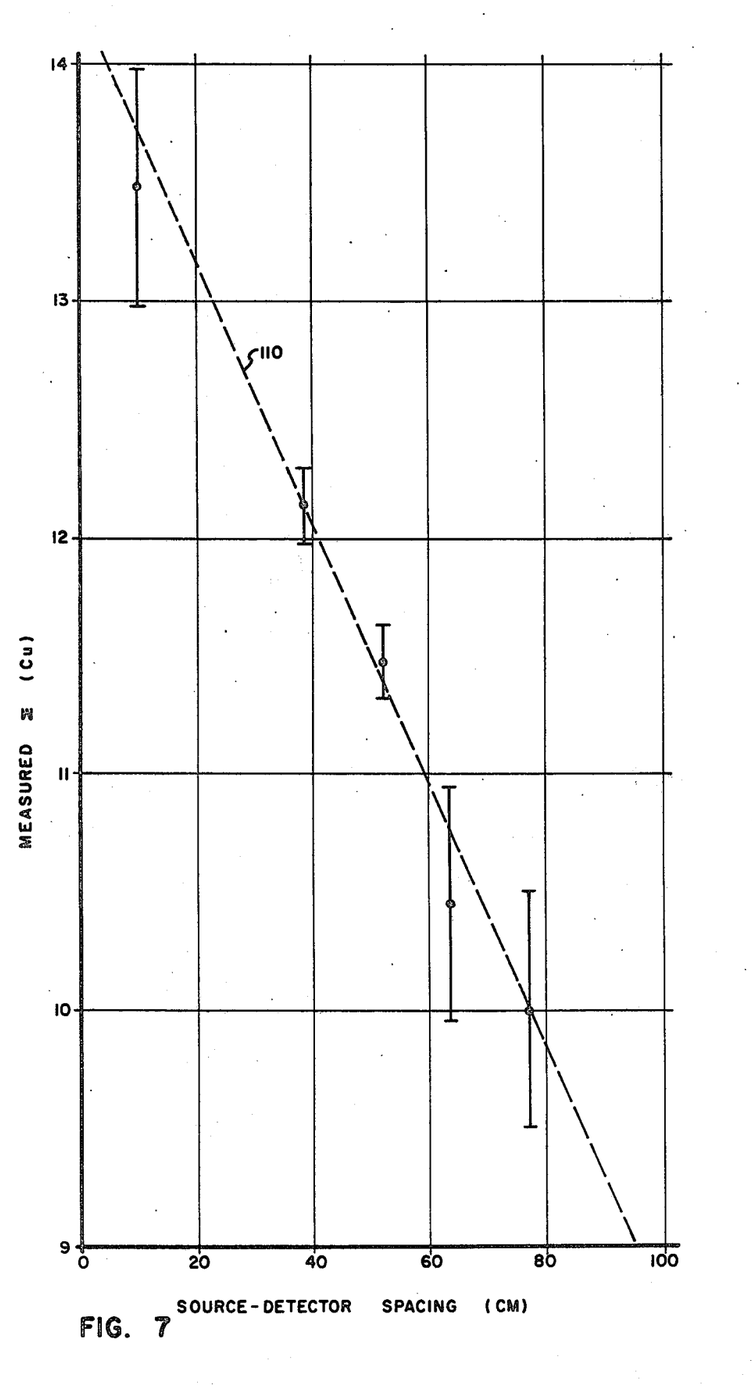
FIG. 7 graphically illustrates the dependence of the measured Sigma upon the source-detector spacing.

FIG. 7 graphically illustrates the effect of varying the source-detector spacing. This data was taken in fresh water sand having 36% porosity. It should be appreciated that the data generated at the 10 centimeter spacing resulted from a so-called "monitor" detector and should not be considered as completely reliable. However, the four other data points have their mid points substantially along the dotted line 110 which does closely coincide with the mid-point of the monitor data. As can be seen from the data illustrated in FIG. 7, the measured Sigma does vary incident to the variation in the source-detector spacing. Thus, in alignment with the theoretical prediction, the measured Sigma does depend upon the source-detector spacing.

It should be appreciated that the logarithmic circuits 99 and 101 can take various forms, but as an example, these circuits may each comprise a power supply, a 16.015 housing, a 16.032-1 log × Fixed Diode Function Generator, a 6.217-1 D.C. amplifier, and an adder and constant multiplier comprising 6.217-1 operational amplifiers, all available from Electronics Associates, Inc., Long Branch, New Jersey. A suitable ratio circuit is disclosed on pages 338 and 339 of *Electronic Computers*, Granino A. Korn and Theresa M. Korn, McGraw-Hill Book Company, Inc., New York, 1956. The subtraction circuit 102 may be of the type illustrated on page 248 of *Electron Tube Circuits*, Samuel Sealey, McGraw-Hill Book Company, Inc., 1958, Second Edition.

The measurement of the macroscopic absorption cross section, Σ, is based upon the detection of gamma rays and not thermal neutrons directly. This procedure, if certain guidelines are followed, is a means of indirectly sampling the presence of thermal neutrons. The source pulses bursts of 14 Mev neutrons, which suffer subsequent inelastic collisions and slow down to thermal velocities. Since a proton is the best moderator of fast neutrons, any fluid-filled porosities will result in a rapid slowing down of the neutrons. Typical sand formations saturated with water have slowdown times of about 12 μsecs for 14 Mev neutrons. Thus, waiting an appropriate time after the burst of fast neutrons will insure that the observed gamma rays are caused by thermal neutron reactions.

The detection of gamma rays has several unique features in addition to the indirect sampling of the thermal neutron population. The observation of gamma rays results in an overall increased depth of investigation. Fortunately, a corresponding decrease in the detection events does not necessarily occur for the more removed signal-source. This characteristic is due to the phenomenon that during an absorption event, many gamma rays are produced resulting in more chances of observing the event. Also of importance is the fact that gamma rays can better penetrate back to the detector than can a thermal neutron migrate through the usually highly absorbing borehole to the detector.

The rate at which thermal neutrons are absorbed is directly proportional to the number of thermal neutrons present. This fundamental principle arises from the statistical independence of each collision of a thermal neutron with a target nucleus. Mathematically, the principle is:

$$(d/dt) N = kN, \qquad (1)$$

where N is the number of thermal neutrons, and k the proportionality constant. The solution of Equation 1 results in the usual expression for the decay of thermal neutrons, that is $$N = N_o e^{kt}, \qquad (2)$$

where $N_o$ is the number of thermal neutrons at time, t=0. The proportionality constant, k, can be obtained from the physical nature of the nuclear species that comprises the media containing the thermal neutrons. Convention describes Equation 2 as $$N = N_o e^{-\Sigma vt} \qquad (3)$$

where v is the speed of the thermal neutron, and Σ the macroscopic absorption cross section.

The apparatus described herein measures the rate of decay of the thermal neutron population (i.e. Σv) by observing the gamma ray field intensity over two separate time intervals. Thus, the natural logarithm of the ratio of the two time-gated counts is proportional to Σ. Delaying the timing gates an appropriate amount (at least 25 μsec) after the start of the burst of 14 Mev neutrons guarantees that the response is from the thermal neutron population.

The most general theoretical approach that could be used to compute the instrument response is the solution of the Boltsmann equation of neutron transport. The exact solution to the Boltzmann equation of neutron transport is generally unknown for practical applications of interest. Since water is a common constituent of the logging environment, the Fermi-Age Approximation cannot be used. The diffusion approximation is widely used to model the transport process for the application to nuclear logging. The results of calculations using this model have been shown to be in reasonable agreement with a number of experimental projects.

The diffusion approximation states that the thermal neutrons that are not absorbed diffuse through the media from regions of high concentrations to regions of low concentration. Thus, the initial thermal neutron cloud determines the characteristics of the subsequent diffusional migration. The process by which the 14 Mev neutrons slow down to thermal velocities dictates the resulting migration of the thermal neutrons. Since the hydrogen concentration is a most important parameter for the moderation of fast neutrons, then it is expected that the fluid-filled porosity will play a role in the transport of the thermal neutrons.

There are several mechanisms whereby thermal neutrons are removed without the emission of gamma rays. The calculation of Σ (of Equation 3) should appropriately account for the many reaction channels. The diffusion of thermal neutrons will redistribute the spatial configuration of the thermal neutron population. Since the apparatus described herein responds indirectly to the presence and absence of thermal neutrons regardless of how they appear or vanish from a particular region, the effect of diffusion is a modification of the measured Sigma (Σ).

The effect of diffusion upon the response is determined by both the nuclear properties and geometrical configuration of the surrounding media. The phenomenon of diffusion makes Equation 3 only an approximate form of Equation 2. One may consider the decay rate, k, to be composed of two parts, absorption and diffusion. Thus, Equation 2 reduces to the form $$N = N_o e^{-(\Sigma v + \Delta)t}, \qquad (4)$$

where Δ is an equivalent rate of decay associated with the diffusion process. Thus for a given region, the rate of absorption plus the rate at which neutrons leave or enter, is the total observed rate of decay.

The magnitude of Δ may be either positive (neutrons leaving the region) or negative (neutrons entering the region). The use of gamma ray detection requires a spatially weighted average over all regions. This fact complicates both the calculation of an instrument response and the use of simple arguments to describe the physical processes involved. However, the trend of Δ decreasing for larger source-detector spacing is expected. It has been determined in accordance with the present invention that the difference between the Σ's measured by the two detectors is due to Δ which responds to the fluid-filled porosity via the diffusion of thermal neutrons.

Thus there has been described and illustrated herein a new and improved method and apparatus which provides a signal representative of the difference between the measured Sigma from two differently spaced detectors in a pulsed neutron logging system which provides a unique function of the fluid-filled porosity of the formation surrounding an earth borehole. Of additional benefit, it has been found that the majority of the salinity and borehole aberations of the measured Sigmas tend to cancel. It should be appreciated that although the preferred embodiment utilizes a pair of gamma radiation detectors and fixed gate circuits connected to said detectors, sliding gates can also be used with the detectors, and it should be appreciated further that there is no requirement that the detectors be the same or, if they are, that they be balanced in any fashion. Since the detectors need not have the same gamma ray energy discrimination, the long-spaced detector measurement of the Sigma can be greatly enhanced by reducing the discriminator level. When reducing the discriminator level for the long-spaced detector, the conventional background subtraction method may be used in conjunction therewith. It should also be appreciated that the system is extremely versatile and that the requirements on the detector system and the neutron generator are such that many different systems can utilize the principle of the invention to obtain a porosity log. As examples, thermal neutron detectors, gamma ray detectors, epithermal neutron detectors, or any combination thereof, can be used with the invention. Likewise, other pulsed sources of fast neutrons can be used. Those skilled in the art will also recognize that a shale correction procedure may be used where needed.

Furthermore, those skilled in the art will recognize that the invention does not require that secondary radiation be measured. For example, neutron detectors can also be used instead of, or in addition to, the gamma ray detectors. Likewise, the surface electronics can be digital if desired to provide data processing.

The embodiments of an invention in which an exclusive property or privilege is claimed are defined as follows:

1. A method for determining the fluid-filled porosity of earth formations surrounding a borehole, comprising:
   irradiating said formations with high energy neutrons;
   detecting secondary radiation from said formations at first and second points spaced from the source of said irradiation;
   generating a first electrical signal indicative of the secondary radiation detected at said first point and functionally related to the macroscopic absorption cross section of said formations;
   generating a second electrical signal indicative of the secondary radiation detected at said second point and functionally related to the macroscopic absorption cross section of said formations; and
   generating a third electrical signal representative of the difference between said first and second signals.

2. The method according to claim 1 wherein said third electrical signal is recorded.

3. The method according to claim 2 wherein at least one of said first and second electrical signals is recorded.

4. A method for investigating the formations surrounding an earth borehole, comprising:
   pulsedly irradiating said formations with high energy neutrons;
   detecting secondary radiation from said formations at a pair of detectors spaced from the source of high energy neutrons;
   generating a first electrical signal from the radiation detected at the first detector functionally related to the decline of the thermal neutron population in said formations following a burst of high energy neutrons;
   generating a second electrical signal from the radiation detected at the second detector functionally related to the decline of the thermal neutron population in said formations following a burst of high energy neutrons; and
   generating a third electrical signal functionally related to the difference between said first and second electrical signals.

5. The method according to claim 4 wherein said third electrical signal is recorded.

6. The method according to claim 5 wherein at least one of said first and second electrical signals is recorded.

7. Apparatus for determining the fluid-filled porosity of the formations surrounding an earth borehole, comprising:
   an elongated instrument adapted to traverse an earth borehole;
   a pulsed source of high energy neutrons in said instrument;
   first and second radiation detectors in said instrument, the first said detector being closer to said neutron source than is said second detector;
   first circuit means connected to said first detector to generate a first electrical signal functionally related to the macroscopic absorption cross section of the formations surrounding said borehole;
   second circuit means connected to said second detector to generate a second electrical signal functionally related to the macroscopic absorption cross section of the formations surrounding said borehole; and
   third circuit means for generating a third electrical signal functionally related to the difference between said first and second electrical signals.

8. The apparatus according to claim 7, including in addition thereto, recorder means for recording said third electrical signal.

9. The apparatus according to claim 8, wherein means are provided for at least one of said first and second electrical signals also being recorded.

* * * * *